United States Patent [19]

Morone

[11] Patent Number: 5,027,754

[45] Date of Patent: Jul. 2, 1991

[54] NON-RETURN VALVE OF THE FLAP TYPE FOR FLOW CONCENTRATION

[75] Inventor: Sergio Morone, Milan, Italy

[73] Assignee: Adler S.P.A., Rovereto, Italy

[21] Appl. No.: 599,487

[22] Filed: Oct. 18, 1990

[30] Foreign Application Priority Data

Oct. 31, 1989 [IT]  Italy .............................. 22024/89[U]

[51] Int. Cl.[5] .............................................. F02M 35/10
[52] U.S. Cl. .............................. 123/52 MF; 123/73 V
[58] Field of Search ............... 123/52 MF, 306, 73 V, 123/65 V; 137/512.1, 512.15, 855, 856

[56] References Cited

U.S. PATENT DOCUMENTS

| | | | |
|---|---|---|---|
| 1,672,436 | 6/1928 | Thege | 137/856 |
| 4,228,770 | 10/1980 | Boyesen | 123/65 V |
| 4,422,416 | 12/1983 | Bernardoni | 123/52 MF |
| 4,474,145 | 10/1984 | Boyesen | 123/52 MF |
| 4,879,976 | 11/1989 | Boyesen | 123/65 V |
| 4,955,329 | 9/1990 | D'Angelo et al. | 123/52 MF |

FOREIGN PATENT DOCUMENTS

| | | | |
|---|---|---|---|
| 547305 | 10/1957 | Canada | 137/856 |
| 0889878 | 12/1981 | U.S.S.R. | 123/52 MF |

*Primary Examiner*—David A. Okonsky
*Attorney, Agent, or Firm*—Herbert Dubno

[57] ABSTRACT

A one-way flap valve, particularly for induction pipes of cylinders of internal combustion engines of vehicles, comprising a number of modular passage units having substantially curved base walls and having internal dividers parallel to the side walls, capable of engaging frontally with flexible air-tight closure flaps to form air flow channels, said modular units are arranged in the pipe in various positions, with at least one of them having an outlet flow direction different from and convergent towards those of the other units, a distance piece having a profile curved according to the deformation curve of each flap of the adjacent units being placed between the unit with a different outflow direction and the adjacent unit.

5 Claims, 3 Drawing Sheets

NON-RETURN VALVE OF THE FLAP TYPE FOR FLOW CONCENTRATION

FIELD OF THE INVENTION

The present invention relates to a non-return valve of the flap type for flow concentration, particularly for use in engines of the internal combustion type.

BACKGROUND OF THE INVENTION

It is known that, in internal combusion engines with fixed timing of the distribution, the selected angles of advance of the opening and lag of the closing of the valves, particularly the inlet valves, are optimal only at certain speeds, while at other speeds they represent a compromise which is sometimes barely acceptable.

Thus it is found that the inlet valves are sometimes opened while the discharge valves are still open (cross-over). While this promotes the discharge of the spent gases from the cylinders at certain speeds, at other speeds it causes a return of the spent gases from the exhaust system to the cylinders and even into the intake pipes, thus decreasing the volumetric efficiency of the engine.

In some cases, moreover, in order to improve the refilling of the cylinders at high speeds, the inlet valves are closed by inertial and resonance effects after the start of the compression storke.

However, at low speeds, owing to the reduced inertia of the charge entering the cylinders, at the start of the compression stroke a considerable part of the charge may flow back into the intake pipes through the inlet valves which are still open, with partial evacuation of the cylinders.

To eliminate these disadvantages, it has been proposed that the intake pipes should be provided with non-return valves capable of permitting the flow of air or mixture into the cylinders and of preventing a reverse flow to the exterior, restraining the charge from flowing back from the cylinder into the intake pipes.

For this purpose, numerous embodiments of non-return valves of the flap type known in the previous art have been used. However, these have the disadvantage of feeding into the intake pipes volumes of air which flow in parallel entry directions as a result of the uniform orientation of the exit direction of the air flow from the flap units of the valves. The volumes of air supplied in this way have a very wide flow section, a low relative density, and a low velocity of entry into the combustion chambers of the cylinders, particularly at low speeds, and consequently the air flow may become turbulent, thus counteracting the desired injection of mixture into the combustion chambers of the cylinders, while promoting, as a result of the low inertia of the air supplied in this way, the return of air into the feed pipe during the time interval required for the cylinders to enter the compression phase and close the inlet valves.

OBJECT OF THE INVENTION

It is, consequently, the object of the invention to provide non-return valves of the flap type which cause flows of air with directions converging towards a single central plane, or alternatively towards a number of planes arranged in a way which provides a higher relative density and higher entry velocity of the flow, to pass into the feed pipes of the inlet valves of internal combusion engines, in order to obtain an improved feed of the mixture to the cylinders and avoid the partial evacuation of the cylinders before the closure of the inlet valves.

SUMMARY OF THE INVENTION

This object is attained by using a non-return valve according to the present invention, which is a one-way flap valve assembly particularly for inlet pipes of cylinders of internal combustion engines of vehicles, comprising a number of modular passage units having substantially curved base walls and having internal dividers parallel to the side walls and capable of engaging frontally with flexible air-tight closure flaps to form air flow channels. These modular units are arranged in the inlet pipe in various positions, with at least one of them having an outlet flow direction different from and convergent towards that of the other units, a distance piece having a profile curved according to the deformation curve of each flap of the adjacent units being placed between the unit with a different outflow direction and the adjacent unit.

In the one-way flap valve assembly according to the invention, the modular units are arranged with outlet directions which may be symmetrical about a plane or about two planes perpendicular to each other, or perpendicular to planes at acute angles to each other.

The distance piece of adjacent modular units with different and convergent outlet directions should preferably be extended into a feed pipe supplying air to the one-way flap valve to form a bulkhead dividing the feed flow and directing it towards the individual flow channels of the valve.

BRIEF DESCRIPTION OF THE DRAWING

Further details may be found in the following description of a valve according to the present invention, with reference to the attached drawings in which.

SPECIFIC DESCRIPTION

Figure 1:
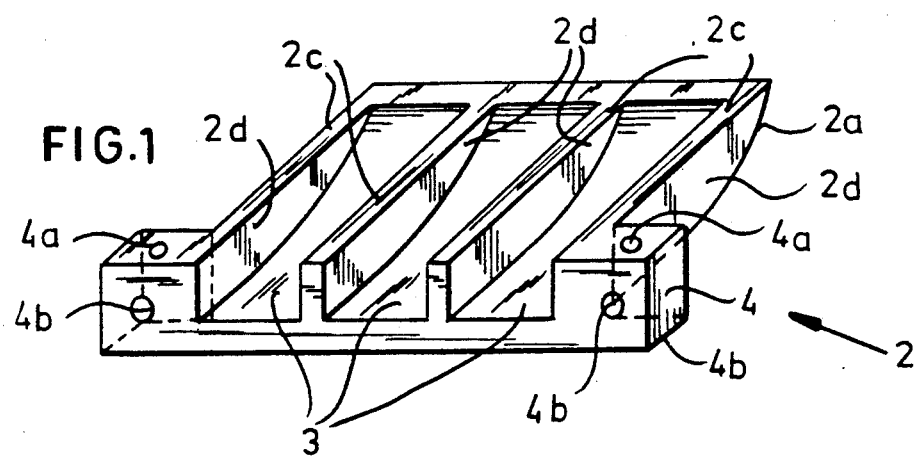
FIG. 1 is a perspective view of a modular unit forming a component of the valve.

With reference to the drawings, a preferred form of the non-return valve 1 according to the invention consists of a set of modular passage units 2 having substantially C-shaped sections with curved base walls 2a and internal dividing walls 2b arranged parallel to the side walls 2d of the unit 2, to form a set of air flow channels 3.

Figure 2:
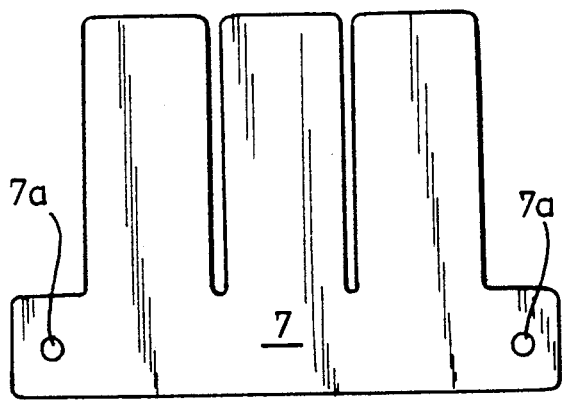
FIG. 2 is an elevational view of a flexible flap.

On the lower part of each unit 2 there are integrally formed blocks 4 having axial holes 4b and transverse holes 4a to allow connection to each other and to a stepped end piece 6 (FIG. 2) which also has transverse holes 6a for the passage of a suitable fastening element to secure the units 2 as a single block and axial holes 6b for the passage of means of fastening to the fixed body of the engine for the installation of the valve 1.

The blocks 4 also have transverse dimensions greater than the corresponding dimension of the block 2, thus providing a step 4c extending across the whole width of the unit 2.

Flexible flaps 7, in the form of an inverted T, and also having holes 7a for the passage of the fastening means, are arranged so that they contact the upper surfaces 2c of the dividing walls 2b and side walls 2d. When the assembly of the whole valve unit is complete, these flaps 7 are held in place by the step 4c and form an air-tight closure of the flow channels 3.

In a preferred example of assembly (FIG. 4), the valve 1 consists of two pairs of modular passage units 2 whose flow channels 3 are closed in an air-tight manner by the flaps 7 and and are orientated with the outlet directions of the flow converging towards a single central plane of symmetry, while the central and adjacent units 2 are spaced from the centre by a distance peice 8 which itself has a profile with external walls curved according to the curve of deformation of the flaps 7 for which they provide a stop.

Figure 4:
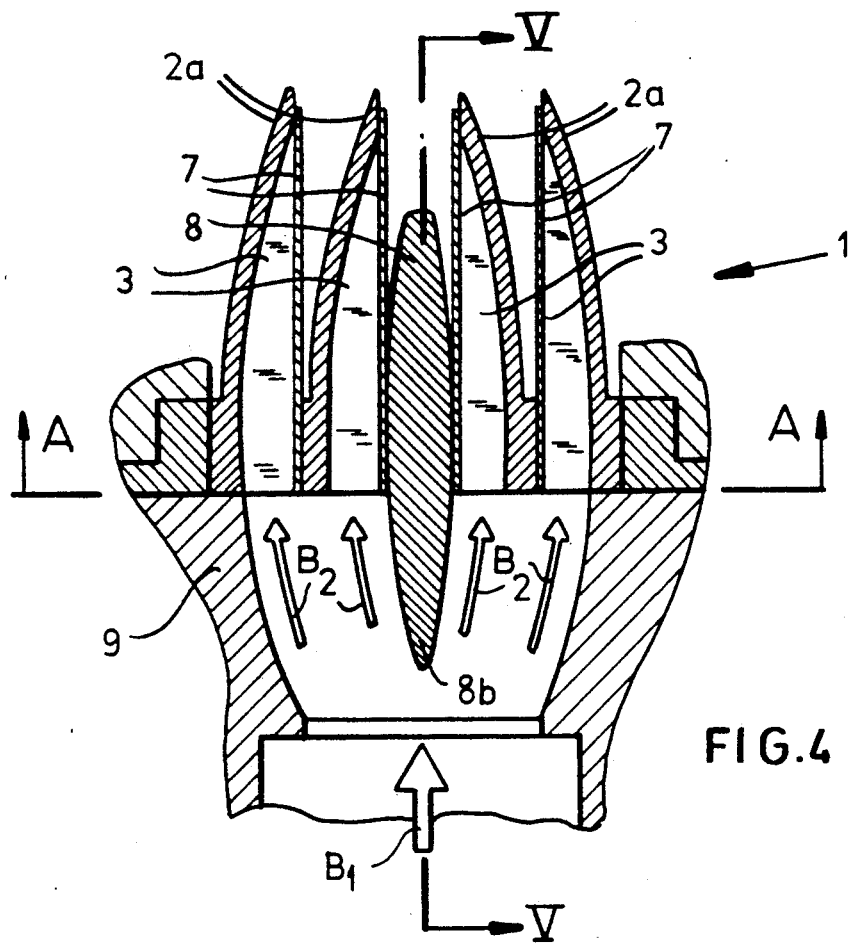
FIG. 4 shows of a valve according to the invention, seen in a section along the plane IV—IV in FIG. 5.
Figure 5:
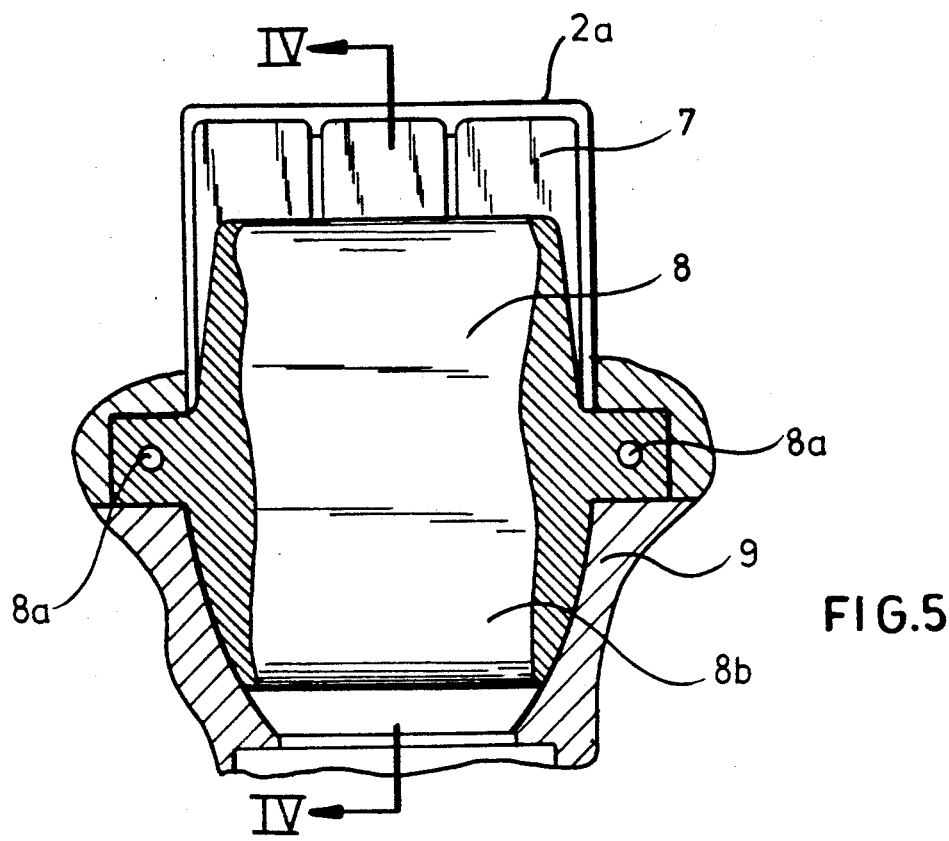
FIG. 5 shows the valve in a section along the plane V—V of FIG. 4.
Figure 6:
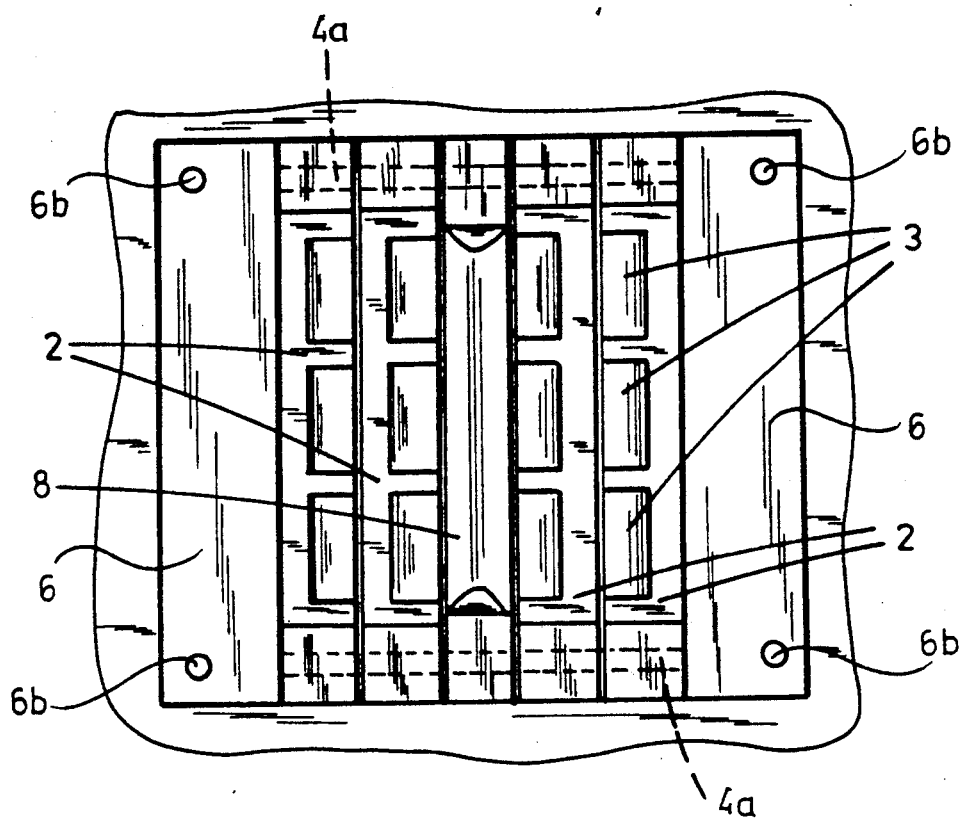
FIG. 6 is a plan view of the valve taken in the direction A—A of FIG. 4.

In the example shown in FIG. 4, the distance piece is extended downwards by the part 8b towards the interior of a part 9 forming the air feed pipe to the valve. The distance piece 8 is also provided with holes 8a for the passage of the element which fastens and secures the whole valve unit. This element is not illustrated in the figure.

When the air flow is sent to the valve 1 through the pipe 9 in the direction of the Arrow $B_1$, it encounters the extension 8b of the piece 8 and is divided and orientated in the directions of the arrows $B_2$, thus providing a better supply of air to the channels 3.

Figure 7:
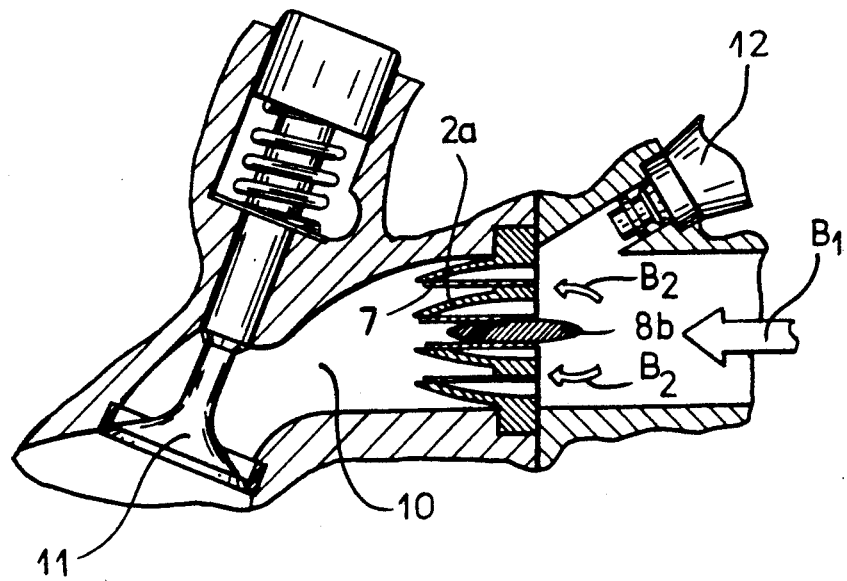
FIG. 7 is a schematic section of an engine with a valve according to the present invention fitted in an intake pipe.

As shown schematically in FIG. 7, the valve unit 1 described above is fitted, in a way which is known and is therefore not detailed in the drawing, to the feed pipe 10 of an inlet valve 11 immediately downstream of the injector 12. When the inlet valve 11 is opened to allow the induction of mixture, the pressure drop due to the action of the piston causes the deflection of the flaps 7, which lie against the curved wall 2a immediately downstream, thus permitting the passage of the air flow which, with the valve configuration described, has a very small surface section is relation to the section of a flow in a normal valve arrangement.

Thus the air flow is highly concentrated, with a significant increase in its relative density and velocity, permitting, among other things, a reduction of the section of the cylinder feed pipe 10.

Figure 8A:
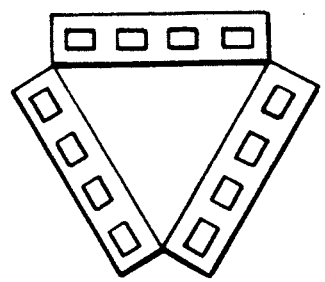
FIGS. 8a and 8b are plan views of different configurations of the valve.
Figure 3:
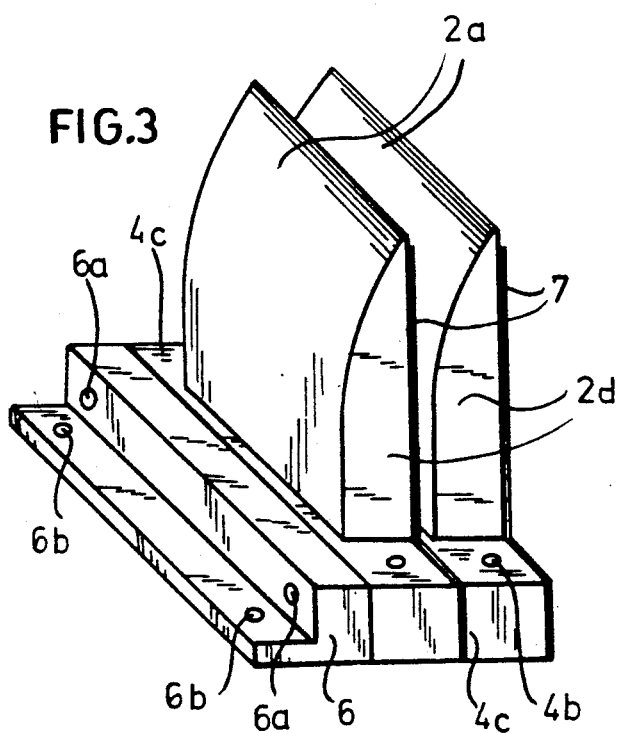
FIG. 3 is a perspective view of the partial assembly of the flap valve.
Figure 8B:
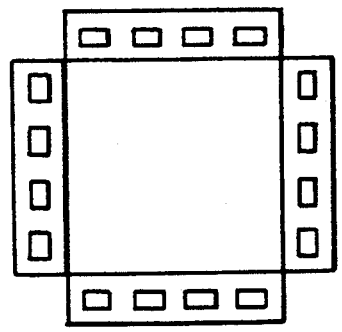

Other arrangements of the modular units 2 to form the non-return valve 1 are also specified as variations; for example, the modular units may be arranged in a triangular configuration (FIG. 8a), or with symmmetrical flow directions with respect to two planes which are perpendicular to each other, forming, for example, a square configuration (FIG. 8b).

I claim:

1. A one-way flap valve assembly, particularly for induction pipes of cylinders of internal combustion engines of vehicles, comprising a number of modular passage units having substantially curved base walls and having internal dividers parallel to the side walls, capable of engaging frontally with flexible air-tight closure flaps to form air flow channels, characterized in that the modular units are arranged in the pipe in various positions, with at least one of them having an outlet flow direction different from and convergent towards those of the other units, a distance piece having a profile curved according to the deformation curve of each flap of the adjacent units being placed between the unit with a different outflow direction and the adjacent unit.

2. A one-way flap valve assembly according to claim 1, characterized in that the modular units are arranged with outlet direction symmetrical about a plane.

3. A one-way flap valve assembly according to claim 1, characterized in that the modular units are arranged with outlet directions symmetrical about two planes which are perpendicular to each other.

4. A one-way flap valve assembly according to claim 1, characterized in that the modular units are arranged with outlet directions perpendicular to planes which are at an acute angle to each other.

5. A one-way flap valve assembly according to claim 1, characterized in that the distance piece of the adjacent modular units with different and convergent outlet directions should preferably be extended into a feed pipe supplying air to the one-way flap valve assembly to form a bulkhead which divides and directs the feed flow.

* * * * *